(12) United States Patent
Scott et al.

(10) Patent No.: US 12,031,725 B2
(45) Date of Patent: Jul. 9, 2024

(54) EFFICIENT UNDER-FIRED BROILER AND GRILL APPARATUS

(71) Applicant: GAS TECHNOLOGY INSTITUTE, Des Plaines, IL (US)

(72) Inventors: Shawn Scott, Mount Prospect, IL (US); Michael Frank Johnson, Elmhurst, IL (US)

(73) Assignee: GAS TECHNOLOGY INSTITUTE, Des Plaines, IL (US)

( * ) Notice: Subject to any disclaimer, the term of this patent is extended or adjusted under 35 U.S.C. 154(b) by 884 days.

(21) Appl. No.: 16/358,981

(22) Filed: Mar. 20, 2019

(65) Prior Publication Data

US 2019/0293300 A1 Sep. 26, 2019

Related U.S. Application Data

(60) Provisional application No. 62/646,709, filed on Mar. 22, 2018.

(51) Int. Cl.
*A47J 37/07* (2006.01)
*F24C 15/10* (2006.01)

(52) U.S. Cl.
CPC ......... *F24C 15/107* (2013.01); *A47J 37/0713* (2013.01)

(58) Field of Classification Search
CPC .................. F24C 15/107; A47J 37/0713
USPC ......................................... 126/167
See application file for complete search history.

(56) References Cited

U.S. PATENT DOCUMENTS

| | | | | |
|---|---|---|---|---|
| 799,956 A * | 9/1905 | Willson | ............ | A47J 37/0713 126/41 R |
| 1,133,850 A * | 3/1915 | Garraux | ............ | A47J 37/0682 126/41 R |
| 1,425,501 A * | 8/1922 | Maul | ............ | A47J 37/06 126/41 R |
| 2,210,069 A * | 8/1940 | Ensign | ............ | F23D 14/586 239/552 |
| 2,655,991 A * | 10/1953 | Kennedy | ............ | F23D 14/14 431/347 |
| 3,312,269 A * | 4/1967 | Arthur | ............ | F23C 99/00 431/328 |
| 4,276,331 A * | 6/1981 | Bothwell | ............ | B28B 19/0023 138/143 |
| 4,715,356 A * | 12/1987 | Reynolds | ............ | A47J 37/0682 126/39 H |
| 4,885,989 A * | 12/1989 | Korpan | ............ | A47J 37/067 99/450 |
| 4,886,044 A | 12/1989 | Best | | |
| 5,649,529 A * | 7/1997 | Lu | ............ | F23M 9/06 126/110 R |
| 5,761,990 A * | 6/1998 | Stewart | ............ | A47J 37/0713 126/39 J |
| 7,853,129 B2 | 12/2010 | Best | | |
| 10,823,429 B2 * | 11/2020 | Best | ............ | F23D 14/14 |

(Continued)

*Primary Examiner* — Avinash A Savani
(74) *Attorney, Agent, or Firm* — Pauley Erickson & Swanson

(57) ABSTRACT

An under-fired grill includes a grate formed with a spaced plurality of metal burner shields each having a curved top support surface and two downward extending legs, wherein food is placed directly on the grate formed by a plurality of top support surfaces of the burner shields for cooking. Each burner shield includes an integrated burner formed below the top support surface.

10 Claims, 2 Drawing Sheets

(56) References Cited

U.S. PATENT DOCUMENTS

2008/0227044 A1* 9/2008 Cookson ................ F23D 14/16
                                                    431/328
2012/0222665 A1* 9/2012 Ahmed ............... A47J 37/0694
                                                    126/25 R

* cited by examiner

EFFICIENT UNDER-FIRED BROILER AND GRILL APPARATUS

BACKGROUND OF THE INVENTION

Field of the Invention

This invention relates generally to a charbroiler, under-fired broiler or grill arrangement that provides for efficient combustion and reduced grease and food particulate emissions generated from the cooking process.

Description of Related Art

Standard gas-fired grills and under-fired charbroilers have low efficiency and high particulate emissions. A desirable design would improve the efficiency of a gas fired grill, reduce particulate emissions and improve cooking quality and control, reducing flare-ups as well.

Current charbroilers and grills typically have a few large burners at the base of the grill (termed under-fired), the burners are oversized to produce fast heat, but an excess of heat is typically lost from the grill. In addition, particulate emissions are high as the grease and food product drip onto heat shields and vaporize or become airborne particulates.

SUMMARY OF THE INVENTION

Charbroilers and outdoor residential grills have large burners with a lot of heat loss resulting in low efficiencies, typically under 35%. The subject design is intended to improve the efficiency of a gas fired grill, protect the burners from damage and clogging due to grease and food dropping onto the surface of a standard grill, provide greater control over the area being heated, and reduce the height of the grill as well since the large burners and the space in between would no longer be needed. In addition, some grills require heating a large thermal mass before the grill is ready for cooking and this design would require less preheat time.

This invention involves a design to increase the efficiency by the use of multiple small burners with more direct heat transfer along with increased radiant heat, better control both for cooking and efficiency, and a reduced footprint. In addition, particulate emissions would be reduced as grease and food particles would fall between the burner/grill surface or grates and could be collected for disposal. Traditional designs would have the grease fall from the cooking grate onto a high temperature burner shield where the grease would be burnt up or flashed and produce particulate emissions.

The subject design preferably involves a series of slender long tube burners, one burner for each grate on the charbroiler/grill surface. Instead of 2-3 large burners being located several inches underneath the grate, as in traditional grill arrangements, the subject design would have a separate burner tube for each metal grate on the grill surface. It is also possible that some grates may not need tube burners in some variations of the design.

Individual burner tubes could be combined to be part of a single burner design with a common air and gas inlet. The burner tube would be located a short distance under the grate onto which the food is cooked. Instead of the typical metal rods on a normal grate, the new grate would comprise slightly wider curved pieces of metal or casted metal parts. The curved metal grates would be heated by the burners, transferring heat to the food being cooked directly by conduction, and the curved surface of the grate would also radiate heat to the surface of the food. It is anticipated that, in addition to heating the metal for conduction heat transfer and radiant heat transfer, heat would still move around and in between the metal curved grates to transfer heat through standard convection heat transfer. The burner and grate could be casted or manufactured together as a single part.

BRIEF DESCRIPTION OF THE DRAWINGS

Objects and features of this invention will be better understood from the following description taken in conjunction with the drawings, wherein.

DETAILED DESCRIPTION

The subject design preferably involves a series of slender long tube burners, one burner tube for each grate on the charbroiler/grill surface, such as shown in FIGS. 1-4. Instead of two or three large burners located several inches underneath the grate, as in traditional grill and under-fired charbroiler designs, the subject invention preferably includes a separate burner for each metal grate on the grill surface. It is understood that for the purposes of this invention, the terms grill and charbroiler are used interchangeably in the following description and the claims.

Figure 3:
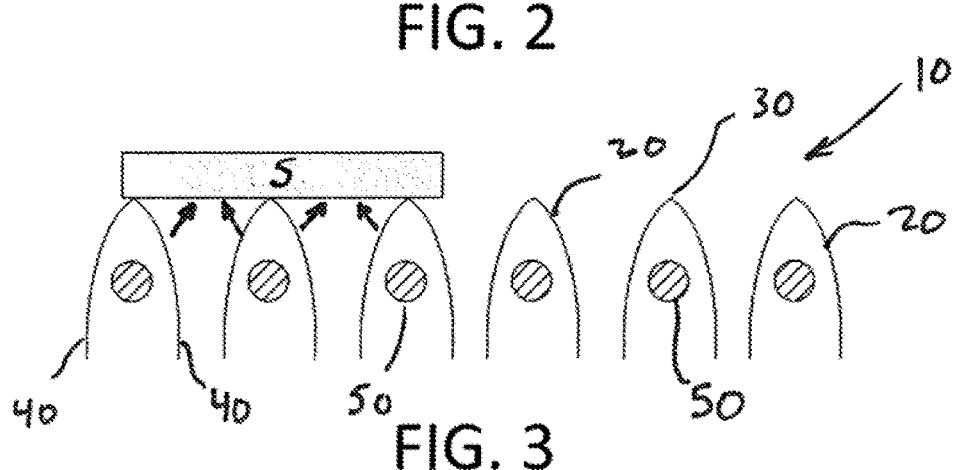
FIG. 3 is a schematic front view of a plurality of burners according to one preferred embodiment.
Figure 4:
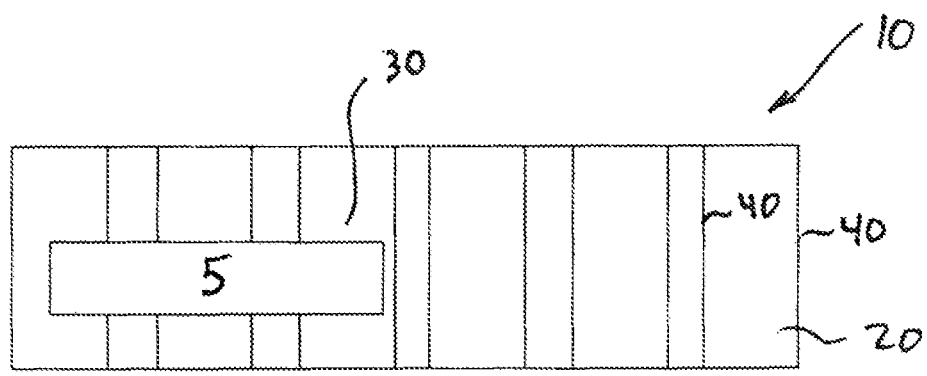
FIG. 4 is a schematic top view of the plurality of burners shown in FIG. 3.

As shown in the figures, an under-fired grill as described preferably includes a grate 10 formed with a plurality of burner shields 20. As used herein, burner shields preferably comprise an inverted elongated trough formed of metal that is open or closed at each end. Each burner shield 20 preferably includes a top support surface 30 and two downward extending legs 40. The resulting assembly of a plurality of spaced parallel burner shields 20 thereby forms the grate 10 wherein food 5 is placed directly on the grate 10 formed by a plurality of top support surfaces 30 of the burner shields 20 for cooking, as shown in FIGS. 3 and 4.

The grate 10 preferably comprises five or more burner shields 20 and associated integrated burners 50. The burner shields 20 are preferably formed of metal and may be cast, extruded or otherwise formed into a desirable inverted trough shape. The burner shields 20 may be solid or may further comprise a plurality of holes or slots formed therein.

Holes or slots may be added to the burner shields 20 to improve the heat transfer to the food being cooked.

Figures 5A, 5B, 5C, 5D, 5E:
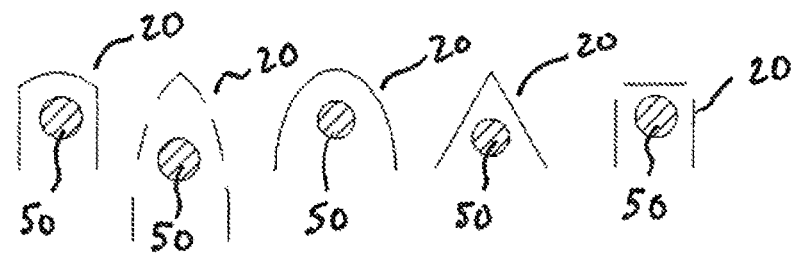
FIG. 5A is a schematic front view of a burner shield according to one preferred embodiment.
FIG. 5B is a schematic front view of a burner shield according to one preferred embodiment.
FIG. 5C is a schematic front view of a burner shield according to one preferred embodiment.
FIG. 5D is a schematic front view of a burner shield according to one preferred embodiment.
FIG. 5E is a schematic front view of a burner shield according to one preferred embodiment.

As shown in FIGS. 5A-5E, the burner shields 20 may comprise a variety of different cross-sections. As shown in FIGS. 5A and 5C, the burner shield 20 may include a curved top support surface 30. Alternatively, as shown in FIGS. 5B and 5D, the burner shield 20 may include a peaked top support surface 30, such as with a torpedo or triangular cross-section, respectively. Still additionally, as shown in FIG. 5E, the burner shield 20 may include a flat top support surface 30.

Figure 1:
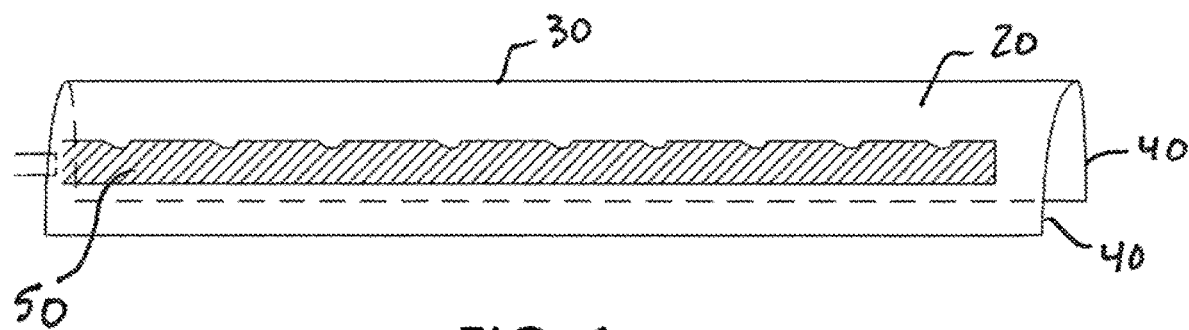
FIG. 1 is a schematic side view of a burner according to one preferred embodiment.
Figure 2:
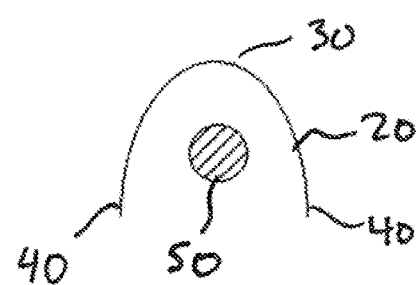
FIG. 2 is a schematic front view of the burner shown in FIG. 1.

Unlike traditional gas fired grills or broilers that contain one to three burners, the subject invention includes an integrated burner 50 formed within each burner shield 20 below the top support surface 30. Each burner 50 as described would be located a short distance under the grate 10 onto which the food 5 is cooked, as shown in FIGS. 2 and 3. Instead of traditional metal rods forming a conventional grate, a grate 10 according to one embodiment would include multiple burner shields 20 forming a grate 10 and each containing a burner 50 as shown in FIGS. 1 and 2. The grate 10 is heated by the respective burners 50, transferring heat to the food being cooked by conduction, and the curved surface of the burner shields 20 also radiates heat to the surface of the food. It is anticipated that in addition to heating the burner shields 20 for conduction heat transfer and radiant heat transfer, heat would still move around and in between the burner shields 20 to transfer heat through standard convection heat transfer, as shown schematically in the arrows flowing from the burner shields 20 to the food 5 in FIG. 3.

Figures 6A, 6B, 6C:
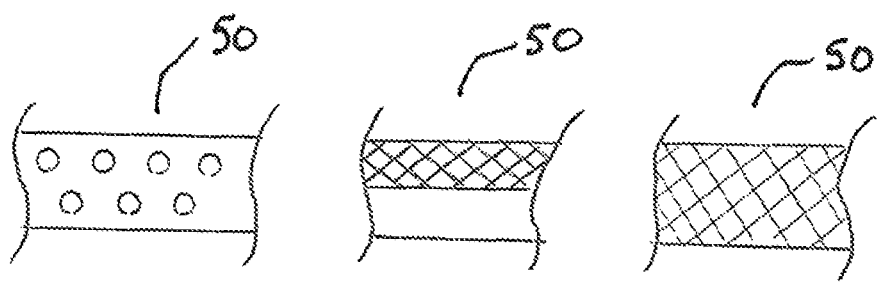
FIG. 6A is a schematic side view of a section of a burner according to one preferred embodiment.
FIG. 6B is a schematic side view of a section of a burner according to one preferred embodiment.
FIG. 6C is a schematic side view of a section of a burner according to one preferred embodiment.

The burners 50 could be a cast metal with drilled holes, standard stamped metal with holes or pierced ports or a meshed metal fiber with one or several burner tubes extending from a single base where air and fuel enter the burner. Another design could use a premixed burner with a blower to attain the needed combustion air. The integrated burner 50 may be as a tube having a plurality of apertures located along a top surface of the integrated burner, such as shown schematically in FIG. 1. Alternatively, the integrated burner 50 is formed with a plurality of apertures located along and around a surface of the integrated burner, such as shown in FIG. 6A. In yet another embodiment, the integrated burner 50 is formed with a metal mesh along a top half of the integrated burner 50, such as shown in FIG. 6B. In still another embodiment, the integrated burner 50 is formed of a tube of metal mesh, such as shown in FIG. 6C.

The integrated burner 50 may be formed of a heat resistant metal or alternatively may be ceramic, a metal foam, or may comprise a ribbon burner.

The proposed design still produces the unique charbroiler taste and grill marks associated with standard grills or broilers. Preferable spacing of the burner shields 20 and integrated burners 50 according to this invention will permit placement of food on the burners without falling between while still permitting the spacing required for effective heat transfer. In addition, the burners 50 are positioned in sufficient proximity to the respective grates to permit desirable heat transfer and still avoid flare-ups and cold spots or hot spots within the grill.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

Moreover, those skilled in the art and guided by the teachings herein identified, described or discussed will understand and appreciate that the subject development encompasses a variety of features and is thus capable of manifestation in a variety of specific forms or embodiments and is thus not to be construed as limited to the specific forms or embodiments herein identified or described.

What is claimed includes:

1. An under-fired grill comprising:
    a grate formed with a plurality of metal burner shields each having a curved top support surface and two downward extending legs, wherein food is placed directly on the grate formed by a plurality of top support surfaces of the burner shields for cooking;
    an integrated burner formed within each burner shield below the top support surface, such that the burner is positioned entirely below the top support surface and entirely above distal ends of the two downward extending legs and generally centered therebetween;
    wherein each burner shield is formed of a solid sheet of metal with no openings within either of the two downward extending legs, and the integrated burner is disposed closer to the top support surface than to the distal ends of the two downward extending legs, whereby each burner heats the top support surface of a corresponding burner shield for conduction heat transfer and radiant heat transfer, and convection heat moves within each burner shield down the two downward extending legs and around the distal ends of the two downward extending legs to transfer heat to the food through convection heat transfer.

2. The under-fired grill of claim 1 wherein the integrated burner is formed with a plurality of apertures located along a top surface of the integrated burner and facing the top support surface.

3. The under-fired grill of claim 1 wherein the integrated burner is formed with a metal mesh along a top half of the integrated burner.

4. The under-fired grill of claim 1 wherein the integrated burner is formed of a tube of metal mesh.

5. The under-fired grill of claim 1 wherein the integrated burner is formed of a ceramic tube.

6. The under-fired grill of claim 1 wherein the integrated burner is formed of a metal foam.

7. The under-fired grill of claim 1 wherein the integrated burner comprises a ribbon burner.

8. The under-fired grill of claim 1 wherein the grate comprises five or more adjacent burner shields and associated integrated burners, wherein adjacent burner shields include gaps between adjacent downward extending legs.

9. The under-fired grill of claim 1 wherein the burner shields further comprise a plurality of holes or slots.

10. The under-fired grill of claim 1 wherein the integrated burner is formed with a plurality of apertures located along and around a surface of the integrated burner.

* * * * *